June 7, 1960 S. R. BJEREUS 2,939,552
BRAKE APPARATUS PARTICULARLY FOR RAILWAY VEHICLES
Filed July 21, 1958 5 Sheets-Sheet 1

June 7, 1960 S. R. BJEREUS 2,939,552
BRAKE APPARATUS PARTICULARLY FOR RAILWAY VEHICLES
Filed July 21, 1958 5 Sheets-Sheet 2

June 7, 1960 S. R. BJEREUS 2,939,552
BRAKE APPARATUS PARTICULARLY FOR RAILWAY VEHICLES
Filed July 21, 1958 5 Sheets-Sheet 4

United States Patent Office 2,939,552
Patented June 7, 1960

2,939,552

BRAKE APPARATUS PARTICULARLY FOR RAILWAY VEHICLES

Sven Ragnar Bjereus, Malmo, Sweden, assignor to Svenska Aktiebolaget Bromsregulator, Malmo, Sweden, a corporation of Sweden Filed July 21, 1958, Ser. No. 749,834

Claims priority, application Great Britain July 26, 1957

4 Claims. (Cl. 188—195)

In brake apparatus for railway and like vehicles it is known to connect a brake lever with two links giving a lower and a higher brake applying leverage, respectively, and to connect the link giving the lower leverage to the brake lever with lost motion which is taken up by a movable abutment to bring this link into and the other link out of action, and to provide a device, called empty-load mechanism, comprising a housing which houses said movable abutment and is pivoted to the brake lever in the point of connection thereof with the link giving the lower leverage and is guided on an extension of this link beyond said point, which extension has an abutment adapted to coact with the movable abutment in the housing.

The present invention relates to empty-load mechanism of the kind stated above and has for its object to provide improvements resulting in a more simple and compact construction of the empty-load mechanism and making it more easy and cheap to manufacture with the desirable exactness.

A preferred form of empty-load mechanism constructed in accordance with the invention is illustrated on the accompanying drawings, in which.

Figure 1:
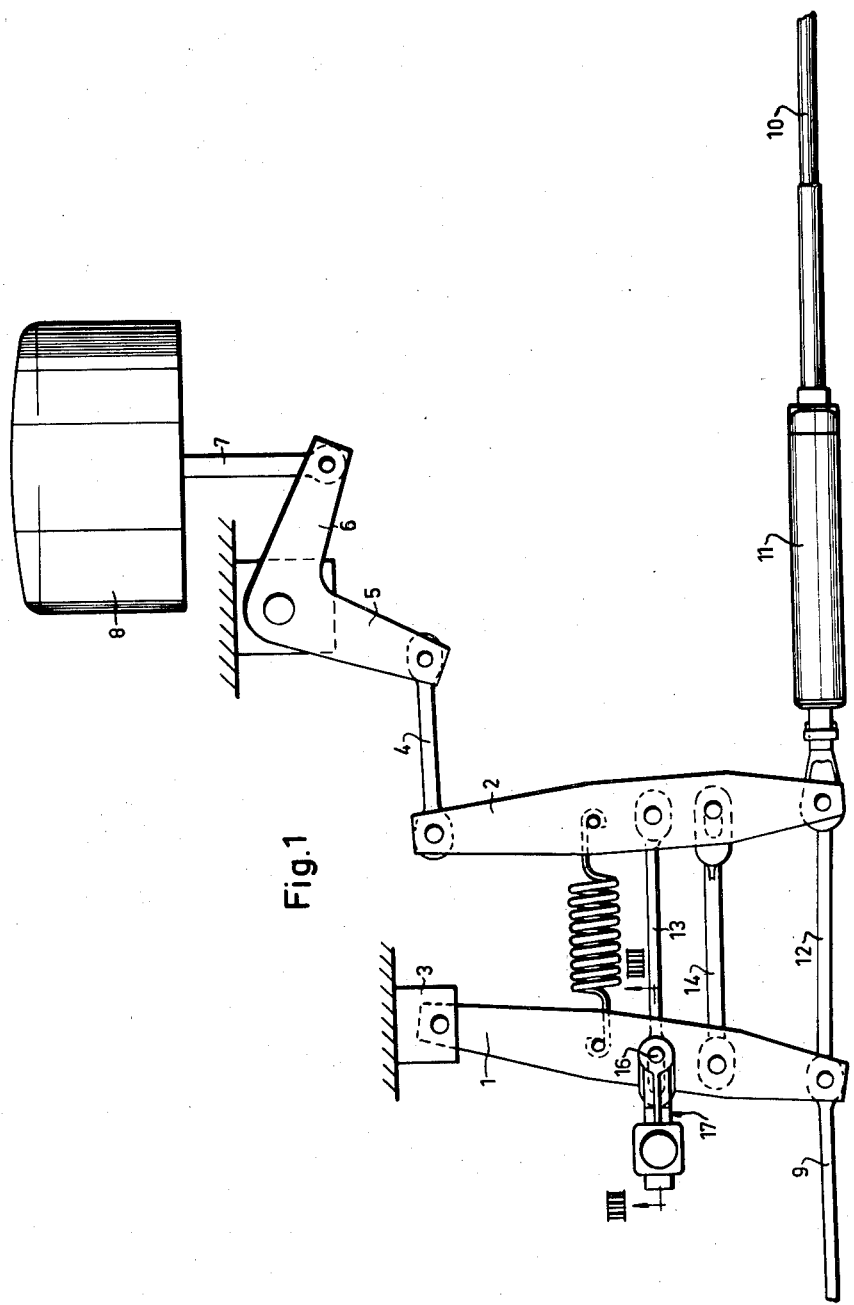
Fig. 1 is a diagrammatic view of part of the brake rigging of a railway vacuum brake and illustrates the mounting of the empty-load mechanism in the brake rigging.
Figure 2:
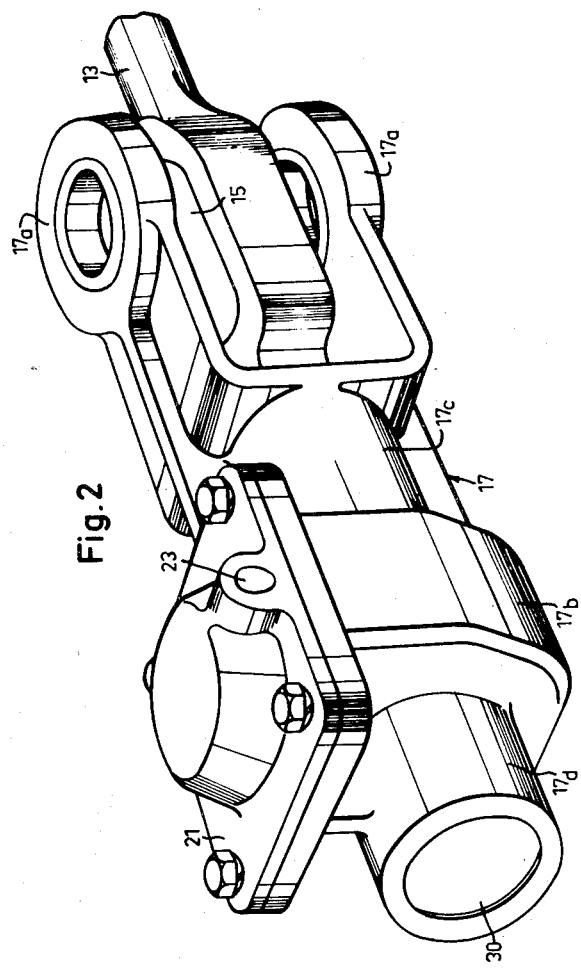
Fig. 2 is a perspective view of the empty-load mechanism and illustrates its compactness.
Figure 3:
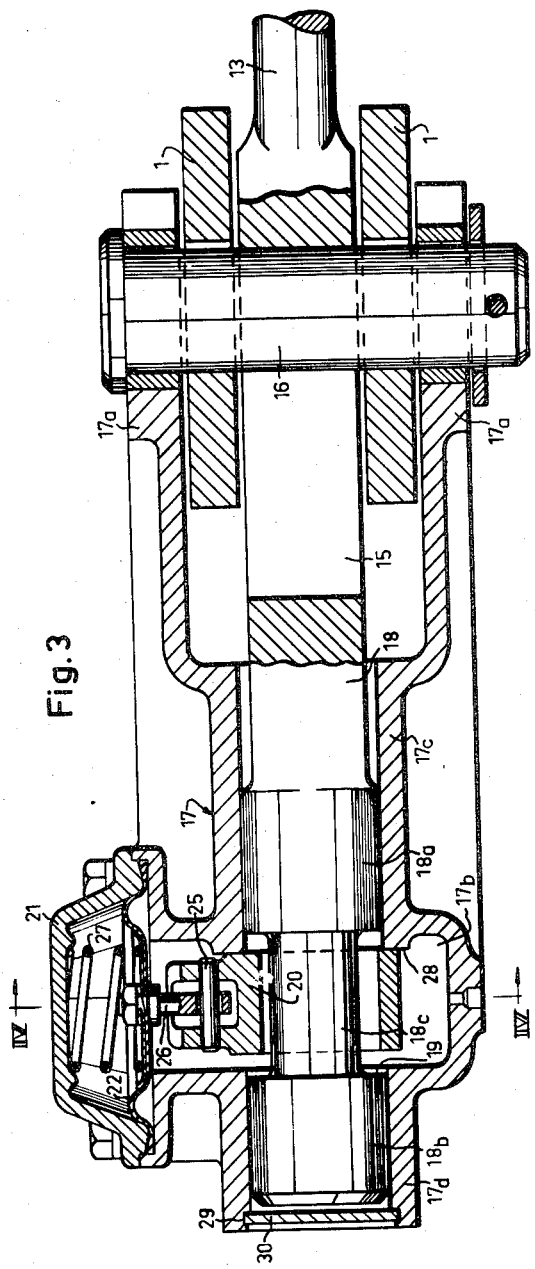
Fig. 3 is a longitudinal section of the empty-load mechanism on line III—III in Fig. 1.
Figure 4:
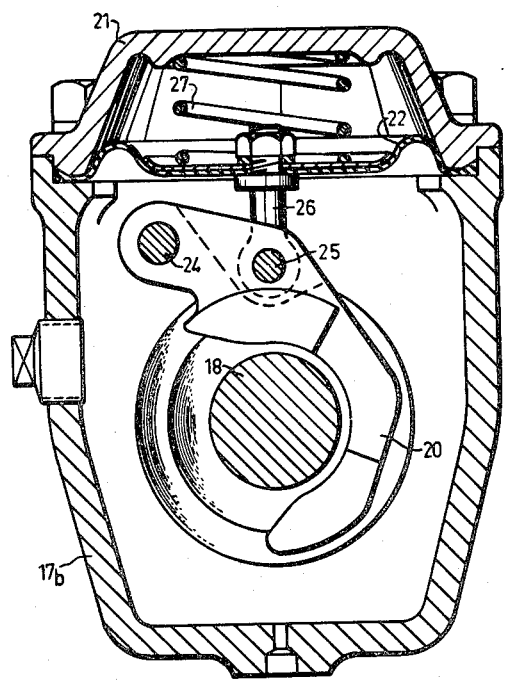
Fig. 4 is a cross section on line IV—IV in Fig. 3.

The brake rigging illustrated in Fig. 1 comprises a pair of equalizing brake levers 1 and 2. The brake lever 1 is fulcrumed at one end to a fixed fulcrum bracket 3, and the adjacent end of the other brake lever 2 is operatively connected by means of a pull rod 4 and lever arms 5 and 6 to the piston rod 7 of a vacuum brake cylinder 8. Connected to the other ends of the two brake levers 1 and 2 are main brake pull rods 9 and 10 extending to the brake equipments at the opposite ends of the car. In the main brake pull rod 10 connected to the brake lever 2 there is shown an automatic brake slack adjuster 11 operating under the control of a control rod 12 connected to the brake lever 1. The two equalizing brake levers 1 and 2 are connected to one another by two links 13 and 14 giving a lower and a higher brake applying leverage, respectively. The link 13 giving the lower leverage is connected to the brake lever 1 with lost motion provided for by means of a slot 15 (Figs. 2 and 3) in this link for the pin 16 (Figs. 1 and 3) connecting it to the lever 1. Each of the levers 1 and 2 is composed of two parallel plates, one on each side of the links 13 and 14. The lost motion of the link 13 giving the lower leverage is taken up to a certain degree by a movable abutment to bring this link into and the other link 14 out of action. The device, called empty-load mechanism, used for cutting in one or the other of the two available different brake applying leverages comprises a housing 17 formed at one end with a two-forked jaw pivoted to the brake lever 1 by means of the pin 16 that connects the link 13 to the lever 1. Said jaw has one of its two branches 17a on each side of the lever 1, as will be best seen from Fig. 3. The housing 17 is guided on an extension 18 of the link 13 beyond its point of connection with the lever 1, and this extension 18 has an abutment 19 (Fig. 3) adapted to coact with the movable abutment 20 (Figs. 3 and 4) which is mounted in an enlarged portion 17b of the housing 17, which integrally connects two tubular portions 17c and 17d of equal inner diameter guiding the housing on cylindrical portions 18a and 18b of the extension 18, which cylindrical portions 18a and 18b are of the same diameter. For the insertion of the movable abutment 20 into the enlarged portion 17b of the housing this portion has an aperture closed by a removable lid 21. The movable abutment 20 may be moved into and out of operative position by means of a vacuum servo motor comprising the lid 21 and a diaphragm 22 clamped in place by the lid over the aperture closed thereby. The lid 21 has an opening 23 (Fig. 2) to be connected to valve means for connecting the space between the lid and the diaphragm to a source of vacuum or to the atmosphere. In the form shown the movable abutment 20 is pivoted in the housing by means of a pin 24 (Fig. 4) and is connected by means of a pin 25 to a bolt 26 secured to the diaphragm 22. A coiled compressed spring 27 is inserted between the diaphragm 22 and the top of the lid 21. Between the two portions 18a and 18b the extension 18 has a portion 18c of reduced diameter to form a recess receiving the movable abutment 20 when this is in the shown operative position for coaction with the abutment 19 which is in the form of a shoulder formed by the step between the portions 18b and 18c of different diameters. When in its operative position the movable abutment 20 acts as an axial spacer between the annular shoulder 19 and an opposed annular shoulder 28 (Fig. 3) formed by the end surface of the tubular portion 17c at the end thereof projecting into the enlarged portion 17b of the housing 17. The portions 17a and 17c of the housing 17 act as a thrust rod between the movable abutment 20 and the pivot pin 16 on braking.

While in previous constructions of the empty-load mechanism the said thrust rod part thereof was made as a separate part of the housing, to which the rest of the housing was bolted, in the construction in accordance with the present invention the thrust rod part comprising the portions 17a and 17c of the housing 17, the outer end portion 17d of the housing, and the intermediate enlarged portion 17b housing the movable abutment 20 are all integral with one another. As a result hereof the internal cylindrical guiding surfaces in both the portions 17d and 17c and the annular shoulder 28 can be machined in one and the same chucking of the housing in a machine-tool to ensure exact axial alignment of the internal cylindrical guiding surfaces in the portions 17d and 17c and exact perpendicularity of the shoulder 28 to both said cylindrical guiding surfaces. By the portion 17d being made open in its outer end, the cutting tool can be inserted through this end, and in the same machining operation an internal annular groove 29 can be cut in this end for receiving the edge of a disk-shaped plate 30 (Fig. 3) closing the end. As is apparent from Figs. 1, 2 and 3, the improvements shown and described also result in a more compact and light construction of the empty-load mechanism and make it more easy to dismantle for inspection and repair and to reassemble without losing its exactness.

Figure 5:
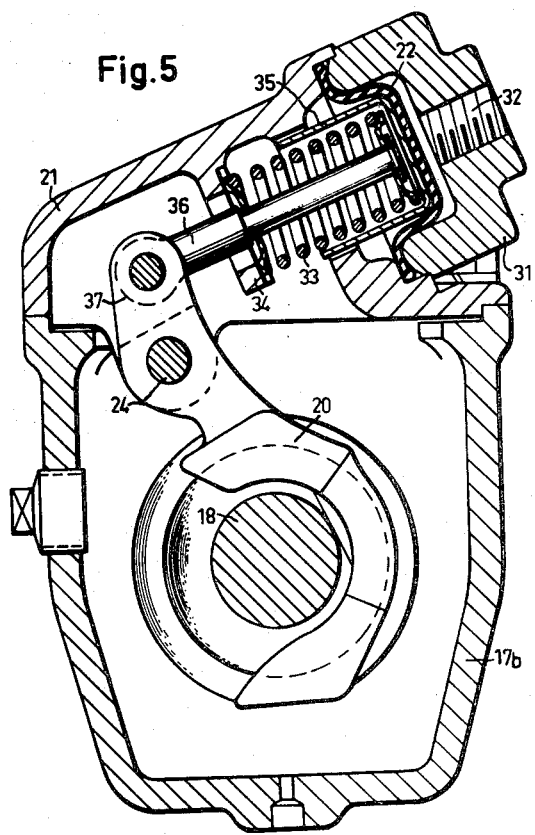
Fig. 5 is a section similar to that of Fig. 4 and shows a modification.

The modification illustrated in Fig. 5 relates to the fluid operated servo motor for the operation of the movable abutment 20 in the enlarged portion 17b of the housing 17 to adapt the device for use in compressed air brakes. While in the form of Figs. 1 to 4 the diaphragm 22 of the servo motor is clamped in place over the aperture in the enlarged portion 17b of the housing between the latter and the lid 21 and is worked by air of atmospheric pressure operating on a vacuum in the lid 21, in the modification shown in Fig. 5 the diaphragm 22 is clamped in place over an aperture in the lid 21 by means of a cup 31 having an opening 32 to be connected to valve means for connecting the space between the diaphragm and the cup to a source of compressed air or to the atmosphere. The diaphragm 22 is worked by the compressed air against the action of a coiled compressed spring 33 inserted between a support 34 in the lid 21 and a piston 35 guided in the aperture in the lid 21 and abutted by the diaphragm 22 and connected by a rod 36 to an arm 37 on the movable abutment 20 pivoted by the pin 24.

What I claim and desire to secure by Letters Patent is:

1. In brake apparatus for railway and like vehicles having means for supporting a brake lever at one or the other of two different points thereof to give respectively a lower or a higher brake applying leverage, said means including a link having a lost motion connection with the brake lever at said one point thereof and an extension projecting beyond said lost motion connection with the brake lever and having portions of equal diameter and an intermediate portion of reduced diameter providing an annular groove in said extension, a housing having a pivotal connection with the brake lever at said one point thereof and having two tubular portions of equal inner diameter guided on said portions of equal diameter of said extension and an enlarged intermediate portion, and an abutment disposed in said enlarged intermediate portion of said housing and movable therein into and out of a position in which said movable abutment engages said extension in said annular groove therein and reduces the lost motion of said lost motion connection to give support to the brake lever at said one point thereof by means of said link, the improvement characterized by the fact that said enlarged intermediate portion of said housing integrally unites said two tubular portions of said housing and has an opening transverse to the longitudinal axis of said housing and substantially parallel to the axis of said pivotal connection of said housing with the brake lever, through which opening said movable abutment is inserted into said enlarged intermediate portion of said housing.

2. The improvement claimed in claim 1 and fluid operated servomotor means connected with said movable abutment for moving said movable abutment into and out of said position, and a cap accommodating said fluid operated servomotor means and forming a lid covering said opening in said enlarged portion of said housing and detachably secured thereto.

3. The improvement claimed in claim 2, said fluid operated servomotor means comprising a diaphragm clamped over said opening in said enlarged portion of said housing by means of said cap and adapted to be acted upon in one direction by air of atmospheric pressure on vacuum being admitted into said cap for moving said movable abutment out of said position, and spring means inserted into said cap for urging said diaphragm in the other direction.

4. The improvement claimed in claim 2, said cap having an opening, a second cap lid covering said opening in first said cap and detachably secured thereto, and said fluid operated servomotor means comprising a diaphragm clamped over said opening in first said cap by means of said second cap and adapted to be acted upon in one direction by compressed air being admitted into said second cap for moving said movable abutment out of of said position, and spring means inserted into first said cap through said opening therein for urging said diaphragm in the other direction.

References Cited in the file of this patent
UNITED STATES PATENTS

| 2,371,798 | Browall | Mar. 20, 1945 |

FOREIGN PATENTS

| 1,122,178 | France | May 14, 1956 |